Patented Oct. 12, 1943

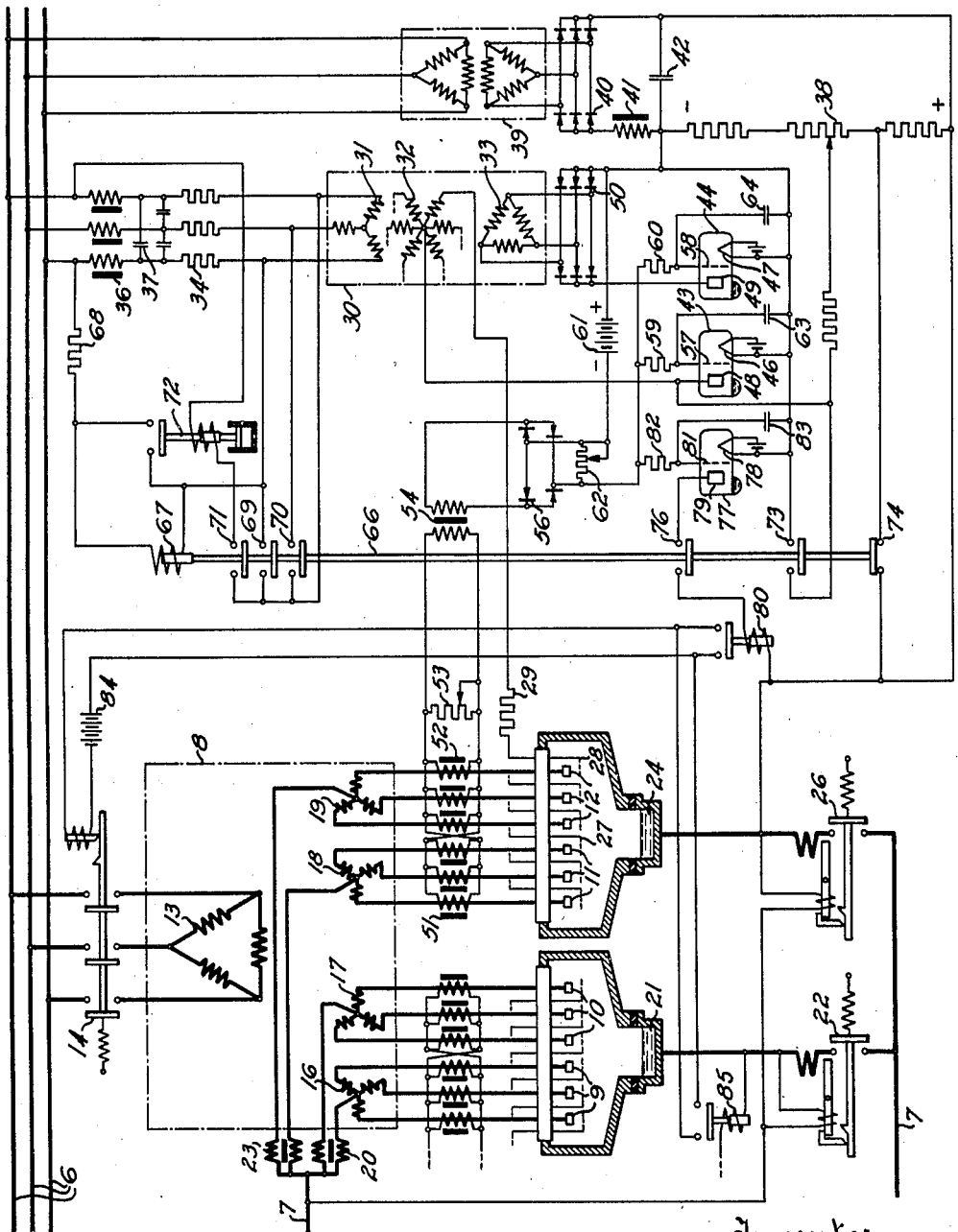

2,331,643

UNITED STATES PATENT OFFICE 2,331,643

ELECTRIC VALVE PROTECTIVE SYSTEM

Harold Winograd, Milwaukee, Wis., assignor to Allis-Chalmers Manufacturing Company, Milwaukee, Wis., a corporation of Delaware Application July 19, 1941, Serial No. 403,183

16 Claims. (Cl. 175—363)

This invention relates in general to improvements in electric valve protective systems and more particularly to means for terminating unbalanced operation of parallel groups of electric valves which may be operated independently of each other.

Electric translating systems comprising electric valves are frequently required to supply current to electric circuits for which the continuity of operation is a prime consideration. For example, rectifying systems may supply direct current to lifting electromagnets in which an accidental interruption of the current results in the magnet dropping its load. However, electric valves are subject to occasional disturbances resulting from failure of valve action, and it is therefore advantageous to arrange the valves in a plurality of parallel groups of rectifying circuits and selectively to interrupt the operation of any group in which a disturbance occurs without interfering with the operation of the remaining groups. The entire system should be rendered inoperative only in the event of the failure of the means for interrupting the operation of a defective group of valves. In order to reduce the number of valves to a minimum the valves of each group are preferably not duplicated and hence all valves operate during different periods. Each group may, however, be divided into sub-groups and the protective devices of the system may be rendered responsive only to unbalance in the currents of each sub-group by suitable arrangement of the connections thereof.

It is therefore one of the objects of the present invention to provide a protective system for a plurality of parallel groups of electric valves operating during different periods, which system is responsive only to occurrence of unbalance between the valve currents.

Another object of the present invention is to provide a protective system for a plurality of parallel groups of electric valves in which the operation of a defective group of valves may be interrupted without affecting the operation of the remaining groups.

Another object of the present invention is to provide a protective system for a plurality of parallel groups of electric valves in which the operation of the entire system is interrupted only upon failure to interrupt the operation of a defective group of valves.

Objects and advantages other than those above described will be apparent from the following description when read in connection with the accompanying drawing, which illustrates one embodiment of the present invention applied to the control of two groups of electric valves connected with an alternating current circuit through a common transformer.

Referring more particularly to the drawing by characters of reference, a polyphase alternating current circuit 6 is to be connected with a direct current circuit 7 through a converting system comprising a transformer 8 and a plurality of groups of electric valves 9, 10, 11 and 12. Either circuit 6 or circuit 7 may be chosen as the supply circuit for the system but it will be assumed that circuit 6 is a supply circuit energized from a suitable generator (not shown) and that circuit 7 is an output circuit transmitting current to suitable load devices (not shown). The load devices may be lifting electromagnets of which the continuity of operation must be maintained.

Transformer 8 comprises a primary winding 13 subdivided into a plurality of phase portions connectable with the phase conductors of circuit 6 through a switch 14 serving to control the connections between circuits 6 and 7 by way of valves 9 to 12. Winding 13 is inductively related with a plurality of secondary windings 16, 17, 18 and 19 each divided into a plurality of phase portions. Each of the phase portions of windings 16 to 19 is connected with one of valves 9 to 12 to form a plurality of parallel groups of rectifying circuits. The different phase portions of windings 16 and 17 are relatively displaced in phase and define two neutral points connected with one conductor of circuit 7 through an interphase transformer 20. The different valves 9, 10 may be provided with separate cathodes or the cathodes may be combined into a common structure 21 connected with the other conductor of circuit 7 through a switch 22.

The different phase portions of windings 18, 19 are severally phase displaced like those of windings 16, 17. The terminal voltages of windings 18, 19 are, however, of the same magnitudes and may have the same phase displacement as the terminal voltages of windings 16, 17. The neutral points of windings 18, 19 are connected with circuit 7 through a second interphase transformer 23. The different valves 11, 12 may be provided with a common cathode 24 connected with circuit 7 through a switch 26. Switches 22 and 26 are provided with polarized tripping devices for causing opening of the switches only upon flow of reverse current therethrough. Suitable known means (not shown) are provided for bringing the cathodes into electron emissive condition and for maintaining the cathodes in such condition as is well known.

Valves 9 to 12 are provided with a dual control and protective system of which only the elements associated with valves 11, 12 will be described in detail, only a few of the elements associated with valves 9, 10 being illustrated in the drawing. The elements associated with valves 11, 12 comprises a plurality of groups of control electrodes 27, 28 for controlling the conductivity of the valves. Each control electrode is connected through a resistor, such as resistor 29, with one of the secondary terminals of a control transformer 30 provided for rendering the valves periodically conductive.

Transformer 30 comprises a primary winding 31, a secondary winding 32 and a tertiary winding 33 and may be of any type supplying voltages of sinusoidal or of peaked wave form. Winding 31 is energized from circuit 6 through connections comprising a plurality of current limiting resistors 34. These connections also preferably include a plurality of reactors 36 associated with suitable capacitors 37 for maintaining sinusoidal the wave form of the voltage impressed on winding 31. Winding 32 is connected in star to provide a neutral point connected with cathode 24 through a portion of a voltage divider 38. The voltage divider receives current from circuit 6 through an insulating transformer 39, a group of rectifying devices 40 and a current smoothing reactor 41. A capacitor 42 connected across the voltage divider cooperates with reactor 41 in reducing the flow of alternating current components through the voltage divider.

The means for rendering valves 11, 12 non-conductive comprise suitable current responsive means such as a pair of auxiliary electric valves 43, 44. The auxiliary valves are preferably of the discontinuously controllable type in which conductive vapor is obtained from a drop of mercury. The cathodes 46, 47 of the auxiliary valves are directly connected with the negative terminal of voltage divider 38. The anode 48 of valve 43 is connected with the neutral point of winding 32 for introducing an additional negative voltage in the control circuits associated with all control electrodes 27, 28 when valve 43 is rendered conductive. The anode 49 of valve 44 is connected with cathode 47 through a group of rectifying devices 50 for operatively short circuiting winding 33 when valve 44 is rendered conductive.

Valves 43, 44 are rendered conductive only in response to the occurrence of unbalance between the currents of valves 11 or of valves 12. For this purpose there are provided two groups of current transformers 51, 52 severally associated with the two groups of valves 11 and 12. The primary windings of transformers 51 are severally included in the rectifying circuits comprising valves 11 and the primary windings of transformers 52 are severally inserted in the rectifying circuits comprising valves 12. The secondary windings of transformers 51 are connected in parallel and the secondary windings of transformers 52 are likewise connected in parallel. The two groups of secondary windings are oppositely connected in parallel and are provided with common connections with an adjusting resistor 53 and with the primary winding of a step-up transformer 54 having its secondary winding connected with a group of rectifying devices 56.

Valves 43, 44 are provided with control electrodes 57, 58 connected with the associated cathodes 46, 47 through current limiting resistors 59, 60, rectifying devices 56 and a source of negative potential such as a battery 61. A leakage resistor 62 is connected across the devices 56 to maintain a continuous circuit between the battery 61 and control electrodes 57, 58. Capacitors 63, 64 are connected between control electrodes 57, 58 and cathodes 46, 47 to prevent operation of valves 43, 44 in response to transient voltages which may appear in the circuits of the system.

Valves 43, 44 may be returned to the inoperative condition by a resetting relay 66. Relay 66 comprises a coil 67 connected across one of the resistors 34 through a resistor 68, and is provided with a plurality of contacts 69, 70 for short circuiting winding 31. Relay 66 is also provided with contacts 71 controlling the connection of the coil of a time delay relay 72 across one of resistors 34. Relay 72 is provided with contacts connected across coils 67 for resetting relay 66. Contacts 73 of relay 66 are provided for short circuiting valve 43, and contacts 74 are provided for removing a short circuit across a portion of voltage divider 38.

For the purpose of causing opening of switch 14 in response to failure of the means above described to interrupt the flow of current through a defective group of valves, relay 66 is provided with further contacts 76 cooperating with a third auxiliary electric valve 77. Valve 77 is similar to valves 43, 44 and is provided with a cathode 78 connected with the negative terminal of voltage divider 39 and an anode 79 connected with the positive terminal of the voltage divider through contacts 76 and through the coil of a tripping relay 80. The control electrode 81 of valve 77 is connected with rectifying devices 56 through a resistor 82 and is connected with cathode 78 through a capacitor 83. Relay 80 is provided with contacts controlling the connection of the trip coil of switch 14 with a suitable source of current such as a battery 84. The contacts of relay 80 are connected in parallel with the contacts of another relay 85 similar to relay 80 and associated with the control means of valves 9, 10.

The system being connected as hereinabove described and circuit 6 being energized, transformer 39 energizes voltage divider 38 which impresses on control electrodes 27, 28 a negative potential component with respect to the potential of cathode 24 to maintain valves 11, 12 non-conductive. Winding 32 of transformer 30 also impresses on the different control electrodes 27, 28 alternating potential components overcoming the component impressed thereon from voltage divider 38 to render valves 11, 12 intermittently conductive.

To place the system in operating condition, switches 14, 22 and 26 are closed. Winding 18 then impresses on the different valves 11 voltages which bring the anodes of the valves sequentially to positive potentials with respect to the potential of cathode 24 to transmit current sequentially from winding 18 to circuit 7. Each valve, however, becomes effective only when the control electrode thereof is imparted a potential which is more positive than the potential of cathode 24 under the joint action of winding 32 and of voltage divider 38. Valves 12 likewise transmit current sequentially under the control of control electrodes 28. Although the phase relation between the voltages of windings 18, 19 causes the operating periods of valves 11 and 12 to be different, the two groups of valves operate in parallel rather than alternately as a result of the presence of interphase transformer 23.

During normal operation with constant current, the current impulses transmitted by the different valves 11 are equal in magnitude and in duration. The secondary currents of transformers 51 therefore constitute a balanced three-phase system of currents of which the sum is equal to substantially zero at every instant. The current transformer secondary windings being connected in parallel, each secondary winding serves as a return path for the other two and the windings do not supply any material amount of current to resistor 53. Likewise the secondary currents of transformers 52 form a balanced three-phase system of currents, and the secondary windings do not transmit any material residual current to resistor 53. The terminal voltage of resistor 53, which is impressed on the primary winding of transformer 54, therefore remains equal to zero and valves 43, 44 and 47 are accordingly maintained non-conductive by battery 61 connected with their control electrodes.

When the magnitude of the flow of current through circuit 1 varies, the flow of current through valves 11 changes correspondingly. During the time required for such change the secondary currents of transformers 51 are not balanced and result in a residual current. At the same time, however, the flow of current through valves 12 changes by the same amount as the current of valves 11, and transformers 52 also produce a residual current equal to that of transformers 51. Because the two groups of secondary windings of transformers 51 and 52 are connected oppositely in parallel these residual currents circulate between the secondary windings and do not appear in resistor 53.

A voltage is impressed on the primary winding of transformer 54 in response to the occurrence of unbalances between the valve currents which do not result from changes of load. If, for example, a backfire takes place in one valve 11, the current of the backfiring valve reverses while the currents of the sound valves of the same group continue to flow in their normal direction. The currents of the three valves therefore become highly unbalanced and a residual current is supplied by transformers 51 to resistor 53. The currents of valves 9 and 10, however, remain balanced and therefore have no effect on the operation of the protective system.

When the residual current through resistor 53 exceeds a predetermined value, the rectified output voltage of transformer 54, which is determined by the adjustment of resistor 53, overcomes the voltage of battery 61 and brings control electrodes 57, 58 and 81 to a positive potential with respect to the potential of cathodes 46, 47, 78. The auxiliary valves thereupon become conductive. Valve 44 receives current from winding 33 through rectifying devices 50 and operatively short circuits winding 33. As a result of the inductive relation between windings 31, 32 and 33, windings 31 and 32 are likewise operatively short circuited. Substantially the full voltage of circuit 6 then appears across the terminals of resistors 34, which prevent short circuiting of circuit 6 by the operation of valve 44. The short circuit placed on winding 33 is not entirely without resistance and the voltage of winding 33 therefore is not quite reduced to zero. It will be understood, however, that the desired result will be obtained if the resistance of rectifying devices 50 and of valve 44 is sufficiently low to cause the voltages of transformer 30 to be reduced to a fraction of their normal operating values.

At the same time valve 43 shunts a portion of voltage divider 38, thereby bringing the potentials of control electrodes 27, 28 to substantially the potential of the negative terminal of rectifying devices 40. As a result of this action of the auxiliary valves 43, 44, control electrodes 27 and 28 are continuously maintained at a negative potential with respect to the potential of cathode 24. The transfer of arcs between the different sound anodes of valves 11 and 12 is thereby prevented and the sound valves become non-conductive. This operation takes place within a fraction of one cycle of the voltage of circuit 6. During this period, however, a large rectified current is supplied to the backfiring anode from windings 16, 17 through valves 9, 10, cathode 21, switch 22, switch 26 and cathode 24, the circuit of the current being completed through winding 18 and interphase transformers 23 and 29. This current, which flows through the current coil of switch 26 in a direction reverse of the normal direction causes opening of switch 26. The switch interrupts the only current still flowing through the faulty valve, which is then rendered non-conductive by its control electrode. Current, however, continues to be converted from circuit 6 and supplied to circuit 7 through winding 13, windings 16, 17, valves 9, 10 and switch 22.

Upon interruption of the flow of current through valves 11, 12, transformers 51, 52 are all deenergized. Control electrodes 57, 58, 81 return to a negative potential with respect to the potential of cathodes 46, 47, 78, but valves 43, 44 continue to carry current because the voltages impressed thereon are unidirectional. Upon operation of valve 44 substantially the full voltage of circuit 6 is impressed on resistors 34 and coil 67, thereby causing relay 66 to operate. Relay 66 closes contacts 69, 70 to short circuit winding 31. Transformer 30 is thereby rendered inoperative and ceases to supply current to valve 44, which is thereupon rendered non-conductive by control electrode 58.

Relay 66 also closes contacts 73 which short circuit valve 43 to stop the flow of current through the valve and enable control electrode 57 to render valve 43 non-conductive. Contacts 74 remove a short circuit across a portion of voltage divider 38 to reduce the flow of current through the voltage divider. Contacts 76 connect valve 77 across voltage divider 38 but valve 77 is then non-conductive if the flow of current through valves 11, 12 has been correctly interrupted and closure of contacts 76 is therefore without any effect.

Relay 66 also closes contacts 71 which connect the coil of relay 72 across one of the resistors 34. After a predetermined time delay, relay 72 closes its contacts to short circuit coil 67. Relay 66 is thereby caused to return to the position shown. The opening of contacts 71 causes relay 72 to return to the position shown. The system is then entirely returned to its normal condition and the operation of valves 11, 12 may be resumed by reclosing switch 26.

The abnormal flow of current through valves 11, 12 may fail to be interrupted at the time of operation of relay 66 as a result either of the failure of control electrodes 27, 28 to properly control the conductivity of the sound valves or by failure of switch 26 to open. If control electrodes 27, 28 fail to render all sound valves 11, 12 non-conductive, the flow of current through the valves remains unbalanced as the backfire condition then subsists. If switch 26 fails to open, valves 9, 10 continue to supply current to the defective anode and this current is rendered pulsating by the voltage of the phase portion of winding 18 associated with the backfiring anode. In either instance, therefore, current transformers 51, 52 continue to supply a residual current to resistor 53 after continuous impression of a negative potential on control electrodes 27, 28 and after operation of relay 66.

Upon closure of contacts 76 by relay 66, valve 77 is then still rendered conductive by control electrode 81 and current flows from rectifying devices 40 through the coil of relay 80, contacts 76 and valve 77, back to the rectifying devices. Relay 80 closes its contacts, thereby completing the circuit of battery 84 with the trip coil of switch 14. The trip coil being energized, switch 14 opens to disconnect transformer 8 and all valves 9, 10, 11, 12 from circuit 6. The entire system thus being put out of operation, the cause of the failure of the protective element to function properly may be investigated before returning at least the sound half of the system to normal operation. It will be understood that a disturbance in the operation of valves 9, 10 would be terminated in the manner above described by the control elements associated with these valves.

Although but one embodiment of the present invention has been illustrated and described, it will be apparent to those skilled in the art that various changes and modifications may be made therein without departing from the spirit of the invention or from the scope of the appended claims.

It is claimed and desired to secure by Letters Patent:

1. In an electric translating system, a supply circuit, a load circuit, means connecting said circuits for the transmission of energy therebetween comprising a plurality of electric valves connected in a plurality of parallel groups of circuits, current controlling means responsive to an abnormal operating condition of one of said groups for causing interruption of the flow of current through said one of said groups only, and means responsive to occurrence of failure of said current controlling means for causing interruption of the flow of current through all said groups.

2. In an electric translating system, a supply circuit, a load circuit, means connecting said circuits for the transmission of energy therebetween comprising a plurality of electric valves connected in a plurality of parallel groups of circuits, current controlling means responsive only to the occurrence of unbalance between the currents of one of said groups for causing interruption of the flow of current through said one of said groups only, and means responsive to occurrence of failure of said current controlling means for causing interruption of the flow of current through all said groups.

3. In an electric translating system, a supply circuit, a load circuit, means connecting said circuits for the transmission of energy therebetween comprising a plurality of electric valves connected in a plurality of parallel groups of rectifying circuits, a switch for controlling the connection between said supply circuit and said load circuit by way of said valves, control means responsive only to the occurrence of unbalance between the currents of said rectifying circuits, conductivity controlling means for said valves responsive to operation of said control means for rendering said valves non-conductive, and means responsive to operation of said control means only when continued subsequently to operation of said conductivity controlling means for causing opening of said switch.

4. In an electric translating system, a supply circuit, a load circuit, means connecting said circuits for the transmission of energy therebetween comprising a plurality of electric valves connected in a plurality of parallel groups of rectifying circuits, a switch for controlling the connection between said supply circuit and said load circuit by way of said valves, control means responsive only to the occurrence of unbalance between the currents of said rectifying circuits, conductivity controlling means for said valves responsive to operation of said control means for rendering said valves non-conductive, and means for causing opening of said switch comprising relay means responsive to operation of said conductivity controlling means and means responsive to simultaneous operation of said relay means and of said control means.

5. In an electric translating system, a supply circuit, a load circuit, means connecting said circuits for the transmission of energy therebetween comprising a plurality of electric valves connected in a plurality of parallel groups of circuits, a switch for controlling all the connections between said supply circuit and said load circuit by way of said valves, current controlling means responsive to an abnormal operating condition of one of said groups for causing interruption of the flow of current through said one of said groups only, and means responsive to occurrence of failure of said current controlling means for causing opening of said switch.

6. In an electric translating system, a supply circuit, a load circuit, means connecting said circuits for the transmission of energy therebetween comprising a plurality of electric valves connected in a plurality of parallel groups of circuits, a switch for controlling all the connections between said supply circuit and said load circuit by way of said valves, current controlling means comprising conductivity controlling means for said valves responsive to an abnormal operating condition of one of said groups for selectively rendering non-conductive the valves of said one of said groups, and means responsive to occurrence of failure of said conductivity controlling means for causing opening of said switch.

7. In an electric translating system, a supply circuit, a load circuit, means connecting said circuits for the transmission of energy therebetween comprising a plurality of electric valves connected in a plurality of parallel groups of rectifying circuits, a switch for controlling all the connections between said supply circuit and said load circuit by way of said valves, control means responsive only to the occurrence of unbalance between the currents of any one of said groups, current controlling means comprising conductivity controlling means for said valves responsive to operation of said control means associated with any one of said groups for rendering non-conductive only the valves of said one of said groups, and means responsive to occurrence of failure of said conductivity controlling means for causing opening of said switch.

8. In an electric translating system, a supply circuit, a load circuit, means connecting said circuits for the transmission of energy therebetween comprising a plurality of electric valves connected in a plurality of parallel groups of rectifying circuits, a switch for controlling all the connections between said supply circuit and said load circuit by way of said valves, current controlling means comprising a second switch serially connected with one of said groups responsive to an abnormal operating condition of said one of said groups for causing interruption of the flow of current through said one of said groups, and means responsive to occurrence of failure of said second switch for causing opening of the first said switch.

9. In an electric translating system, a supply circuit, a load circuit, means connecting said circuits for the transmission of energy therebetween comprising a plurality of electric valves connected in a plurality of parallel groups of circuits, a switch for controlling all the connections between said supply circuit and said load circuit by way of said valves, means for causing interruption of the flow of current through one of said groups comprising a second switch responsive to an abnormal operating condition of said one of said groups and conductivity controlling means for rendering non-conductive only the valves of said one of said groups upon occurrence of said abnormal condition, and means responsive to occurrence of failure of any of said current interrupting means for causing opening of the first said switch.

10. In an electric translating system, a supply circuit, a load circuit, means connecting said circuits for the transmission of energy therebetween comprising a plurality of electric valves connected in a plurality of parallel groups of rectifying circuits, and means for rendering said valves non-conductive comprising current responsive means and a plurality of current transformers having primary and secondary windings, each of said rectifying circuits comprising one of said valves serially connected with one of said primary windings, the different said rectifying circuits being connected to carry current during different periods and the different said groups being connected to carry equal currents simultaneously, said secondary windings of each said group being connected in parallel to form groups of windings oppositely connected in parallel to form groups of windings oppositely connected in parallel, and common connections between said groups of windings and said current responsive means.

11. In an electric translating system, a supply circuit, a load circuit, means connecting said circuits for the transmission of energy therebetween comprising a plurality of electric valves and a transformer having a plurality of polyphase windings each divided into a plurality of phase portions, and means for rendering said valves non-conductive comprising current responsive means and a plurality of current transformers having primary and secondary windings, the different said phase portions being all of different phases, each of said phase portions being connected in series with one of said valves and with one of said primary windings, and the different said polyphase windings being connected to carry equal currents simultaneously, said secondary windings associated with each said polyphase winding being connected in parallel to form groups of windings oppositely connected in parallel, and common connections between said groups of windings and said current responsive means.

12. In an electric translating system, a supply circuit, a load circuit, means connecting said circuits for the transmision of energy therebetween comprising a plurality of electric valves connected in a plurality of parallel groups of circuits, a first current controlling means responsive to an operating condition of one of said groups for causing interruption of the flow of current through said one of said groups only, a second current controlling means for causing interruption of the flow of current through all said groups, and means responsive to operation of said first current controlling means for rendering said second current controlling means responsive to said operating condition.

13. In an electric translating system, a supply circuit, a load circuit, means connecting said circuits for the transmission of energy therebetween comprising a plurality of electric valves connected in a plurality of parallel groups of circuits, a plurality of current controlling means severally associated with the different said groups and each responsive to an operating condition of one of said groups for causing interruption of the flow of current through the said one of said groups only, another current controlling means common to all said groups for causing interruption of the flow of current through all said groups, and means responsive to operation of any of the first said current controlling means for rendering the second said current controlling means responsive to all said operating conditions.

14. In an electric translating system, a supply circuit, a load circuit, means connecting said circuits for the transmission of energy therebetween comprising a plurality of electric valves connected in a plurality of parallel groups of circuits, a first circuit controlling means responsive only to the occurrence of unbalance between the currents of one of said groups for causing interruption of the flow of current through said one of said groups only, a second current controlling means for causing interruption of the flow of current through all said groups, and means responsive to operation of said first current controlling means for rendering said second current controlling means responsive to occurrence of said current unbalance.

15. In an electric translating system, a supply circuit, a load circuit, means connecting said circuits for the transmission of energy therebetween comprising a plurality of electric valves connected in a plurality of parallel groups of circuits, a switch for controlling all the connections between said supply circuit and said load circuit by way of said valves, current controlling means comprising conductivity controlling means for said valves responsive to an operating condition of one of said groups for selectively rendering non-conductive the valves of said one of said groups, control means for causing opening of said switch and means responsive to operation of said current controlling means for rendering said control means responsive to said operating condition.

16. In an electric translating system, a supply circuit, a load circuit, means connecting said circuits for the transmission of energy therebetween comprising a plurality of electric valves connected in a plurality of parallel groups of circuits, a switch for controlling all the connections between said supply circuit and said load circuit by way of said valves, current controlling means comprising conductivity controlling means for said valves responsive only to the occurrence of unbalance between the currents of one of said groups for rendering non-conductive the valves of said one of said groups only, control means for causing opening of said switch and means responsive to operation of said current controlling means for rendering said control means responsive to occurrence of said current unbalance.

HAROLD WINOGRAD.

CERTIFICATE OF CORRECTION.

Patent No. 2,331,643. October 12, 1943.

HAROLD WINOGRAD.

It is hereby certified that error appears in the printed specification of the above numbered patent requiring correction as follows: Page 5, first column, lines 53 and 54, claim 10, strike out "to form groups of windings oppositely connected in parallel"; and that the said Letters Patent should be read with this correction therein that the same may conform to the record of the case in the Patent Office.

Signed and sealed this 30th day of November, A. D. 1943.

(Seal)

Henry Van Arsdale,
Acting Commissioner of Patents.